US012198876B2

(12) United States Patent
Huang et al.

(10) Patent No.: US 12,198,876 B2
(45) Date of Patent: Jan. 14, 2025

(54) KEY STRUCTURE

(71) Applicant: Lite-On Technology Corporation, Taipei (TW)

(72) Inventors: Chun-Chieh Huang, Taipei (TW); Ming-Fu Yen, Taipei (TW); Che Hung Wu, Taipei (TW); Juo-Tau Lee, Taipei (TW); Ta-Ching Lu, Taipei (TW); Chieh-Liang Hsiao, Taipei (TW); Wei-Pin Chuang, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 381 days.

(21) Appl. No.: 17/551,203

(22) Filed: Dec. 15, 2021

(65) Prior Publication Data

US 2022/0189716 A1 Jun. 16, 2022

Related U.S. Application Data

(60) Provisional application No. 63/125,957, filed on Dec. 15, 2020, provisional application No. 63/242,498, (Continued)

(51) Int. Cl.
*H01H 13/83* (2006.01)

(52) U.S. Cl.
CPC ....... *H01H 13/83* (2013.01); *H01H 2219/054* (2013.01)

(58) Field of Classification Search
CPC ......... H01H 2219/00; H01H 2219/014; H01H 2219/036; H01H 2219/039; H01H 2219/054; H01H 2219/056; H01H 2219/058; H01H 2219/06; H01H 2219/062; H01H 2219/0622; H01H 2219/064; H01H 2219/066; H01H 2215/044; H01H 3/00; H01H 3/12; H01H 3/50; H01H 3/52; H01H 13/00; H01H 13/04; H01H 13/14;
(Continued)

(56) References Cited

U.S. PATENT DOCUMENTS 7,525,056 B2 * 4/2009 Chiba .................... H01H 13/83 200/314
9,024,214 B2 * 5/2015 Niu ........................ H01H 3/122 200/344
(Continued)

FOREIGN PATENT DOCUMENTS

CN 101488740 7/2009
CN 201780909 3/2011
(Continued)

OTHER PUBLICATIONS

"Office Action of China Counterpart Application", issued on Jan. 22, 2024, p. 1-p. 18.

*Primary Examiner* — Anthony R Jimenez
(74) *Attorney, Agent, or Firm* — JCIPRNET

(57) ABSTRACT

A key structure including a first electrode, a key cap, and a restoration member is provided. The key cap is disposed on the first electrode. The restoration member is disposed between the key cap and the first electrode. The key cap or the restoration member has a second electrode. A sensing signal is generated by the second electrode with the key cap or the restoration member moving relative to the first electrode.

24 Claims, 18 Drawing Sheets

Related U.S. Application Data filed on Sep. 10, 2021, provisional application No. 63/251,691, filed on Oct. 4, 2021.

(58) Field of Classification Search

CPC ........ H01H 13/26; H01H 13/50; H01H 13/52; H01H 13/70; H01H 13/702; H01H 13/704; H01H 13/807; H01H 13/83; H01H 13/125

USPC .................................................. 200/314, 341

See application file for complete search history.

(56) References Cited

U.S. PATENT DOCUMENTS

| | | | | |
|---|---|---|---|---|
| 9,634,661 | B1 * | 4/2017 | Chen .................... | H03K 17/969 |
| 11,418,193 | B2 * | 8/2022 | Hsu .......................... | H01H 3/12 |

FOREIGN PATENT DOCUMENTS

| | | |
|---|---|---|
| CN | 102024599 | 4/2011 |
| CN | 201812713 | 4/2011 |
| CN | 102064033 | 5/2011 |
| CN | 102931014 | 2/2013 |
| CN | 103839719 | 6/2014 |
| CN | 104765512 | 7/2015 |
| CN | 105931907 | 9/2016 |
| CN | 206931515 | 1/2018 |
| CN | 208580680 | 3/2019 |
| TW | 201421516 | 6/2014 |
| TW | M547128 | 8/2017 |

* cited by examiner

KEY STRUCTURE

CROSS-REFERENCE TO RELATED APPLICATION

This application claims the priority benefit of U.S. provisional application Ser. No. 63/125,957, filed on Dec. 15, 2020, U.S. provisional application Ser. No. 63/242,498, filed on Sep. 10, 2021, and U.S. provisional application Ser. No. 63/251,691, filed on Oct. 4, 2021. The entirety of each of the above-mentioned patent applications is hereby incorporated by reference herein and made a part of this specification.

BACKGROUND

Technical Field

The disclosure relates to a key structure, and more particularly, to a key structure applied to a capacitive keyboard.

Description of Related Art

As a common physical input device, the keyboard is used to assist users in operating or inputting signals to a personal desktop computer, a notebook computer or a tablet computer, or other electronic products equipped with a keyboard or an external keyboard. Specifically, the keyboard is composed of multiple key structures, and may be divided into a membrane keyboard and a mechanical keyboard according to the triggering manner. Since the response time of the membrane keyboard and the mechanical keyboard is relatively slow, and there will be loss of physical contact, how to enhance the operating sensitivity of the keyboard and reduce the possibility of false triggering has always been a matter of great concern to the relevant manufacturers.

SUMMARY

The disclosure relates to a key structure, which could enhance sensitivity of electrical operation and reduce possibility of false triggering.

According to an embodiment of the disclosure, a key structure includes a first electrode, a key cap, and a restoration member. The key cap is disposed on the first electrode. The restoration member is disposed between the key cap and the first electrode, and the key cap or the restoration member has a second electrode. The second electrode generates a sensing signal by the key cap or the restoration member moving relative to the first electrode.

In the key structure according to an embodiment of the disclosure, the key cap has the second electrode. The key cap includes a body and a conductive layer disposed on the body, and the conductive layer completely covers or partially covers an outer surface of the body.

In the key structure according to an embodiment of the disclosure, the key cap further includes a passivation layer. The passivation layer is disposed on the conductive layer, and the conductive layer is located between the passivation layer and the body.

In the key structure according to an embodiment of the disclosure, the key cap further includes a priming coat. The priming coat is disposed on the body, and the priming coat is located between the conductive layer and the body.

In the key structure according to an embodiment of the disclosure, the conductive layer has a light transmission portion.

In the key structure according to an embodiment of the disclosure, a material of the key cap includes conductive particles, metal, transparent conductive oxide, carbon nanotube, or graphene.

In the key structure according to an embodiment of the disclosure, the restoration member has the second electrode, and the restoration member includes an elastic member, a connection assembly, or an axis body. A material of the restoration member includes conductive particles, metal, transparent conductive oxide, carbon nanotube, or graphene.

In the key structure according to an embodiment of the disclosure, the key structure further includes a switch assembly disposed on the first electrode. When the key structure is pressed, the switch assembly generates a trigger signal through contacting or blocking.

In the key structure according to an embodiment of the disclosure, the key structure further includes a balance rod disposed between the key cap and the first electrode, and the balance rod includes an insulating material.

In the key structure according to an embodiment of the disclosure, the key structure further includes a backlight module. The first electrode is disposed on the backlight module, and the first electrode has a light transmission opening.

In the key structure according to an embodiment of the disclosure, the restoration member is the elastic member, and the elastic member has a protrusion facing the first electrode. The protrusion has a recess, and an opening of the recess faces the first electrode.

In the key structure according to an embodiment of the disclosure, the key structure further includes a light source disposed on the first electrode, and the light source is disposed corresponding to the recess of the elastic member.

According to another embodiment of the disclosure, a key structure includes an electrode layer, a key cap, an insulative base plate, an elastic member, and a connection assembly. The key cap is disposed on the electrode layer, and includes a conductive material. The insulative base plate is disposed on the electrode layer, and is located between the key cap and the electrode layer. The elastic member is disposed between the key cap and the insulative base plate. The connection assembly is disposed between the key cap and the electrode layer.

In the key structure according to another embodiment of the disclosure, the key cap includes a body, a conductive layer, and a passivation layer. The conductive layer is disposed on the body, and completely covers or partially covers an outer surface of the body. The passivation layer is disposed on the conductive layer. The conductive layer is located between the passivation layer and the body, and the conductive layer has a light transmission portion.

In the key structure according to another embodiment of the disclosure, a material of the key cap includes conductive particles, metal, transparent conductive oxide, carbon nanotube, or graphene, and a material of the insulative base plate includes plastic, carbon fiber, or glass fiber.

In the key structure according to another embodiment of the disclosure, the key structure further includes a backlight module. The electrode layer is disposed on the backlight module, and the electrode layer is located between the insulative base plate and the backlight module. The key cap has the light transmission portion. The electrode layer has a first light transmission opening corresponding to the light transmission portion, and the insulative base plate has a second light transmission opening partially overlapping the first light transmission opening.

In the key structure according to another embodiment of the disclosure, the key structure further includes a positioning member. The positioning member is engaged with the electrode layer and passes through the insulative base plate. One end of the connection assembly is connected to the positioning member, and another end of the connection assembly is connected to the key cap.

In the key structure according to another embodiment of the disclosure, the key structure further includes the positioning member engaged with the insulative base plate. One end of the connection assembly is connected to the positioning member, and another end of the connection assembly is connected to the key cap.

In the key structure according to another embodiment of the disclosure, the key structure further includes a light source electrically connected to the electrode layer. The elastic member has an accommodating space, and the light source is located in the accommodating space. When the key structure is pressed, the elastic member does not interfere with the light source.

According to still another embodiment of the disclosure, a key structure includes an electrode layer, a key cap, an elastic member, a connection assembly, and a conductive contact. The key cap is disposed on the electrode layer. The elastic member is disposed between the key cap and the electrode layer. The connection assembly is disposed between the key cap and the electrode layer. The conductive contact is disposed on the electrode layer, and the elastic member covers the conductive contact.

In the key structure according to still another embodiment of the disclosure, the key structure further includes a membrane circuit disposed on the electrode layer. The membrane circuit is located between the elastic member and the electrode layer, and the membrane circuit includes the conductive contact.

In the key structure according to still another embodiment of the disclosure, conductive particles are added to the elastic member, so that the elastic member contacts the conductive contact to generate a trigger signal.

In the key structure according to still another embodiment of the disclosure, the key structure further includes a positioning member. The positioning member is engaged with the electrode layer, and one end of the connection assembly is connected to the positioning member.

In the key structure according to stull another embodiment of the disclosure, a material of the key cap includes conductive particles, metal, transparent conductive oxide, carbon nanotube, or graphene, so that the key cap moves relative to the electrode layer to generate a sensing signal.

According to yet another embodiment of the disclosure, the key structure includes an electrode layer, a key cap, an elastic member, a connection assembly, and an optical switch module. The key cap is disposed on the electrode layer. The elastic member is disposed between the key cap and the electrode layer. The connection assembly is disposed between the key cap and the electrode layer. The optical switch module is disposed on the electrode layer, and is located between the key cap and the electrode layer.

According to yet another embodiment of the disclosure, the optical switch module includes an optical transmitter and an optical receiver. The restoration member includes a connection assembly or an axis body, and a part of the connection assembly or the axis body has a moving path passes between the optical transmitter and the optical receiver.

Based on the above, in the key structure of the disclosure, the design of any one of the key cap, the elastic member, and the connection assembly having the conductivity not only enhances the operating sensitivity of the key structure, but also reduces the possibility of false triggering. Besides, since additional conductive members is not required in the key structure to trigger a switch, it could simplify the mechanism.

In order for the aforementioned features and advantages of the disclosure to be more comprehensible, embodiments accompanied with drawings are described in detail below.

DETAILED DESCRIPTION OF DISCLOSED EMBODIMENTS

Figure 1A:
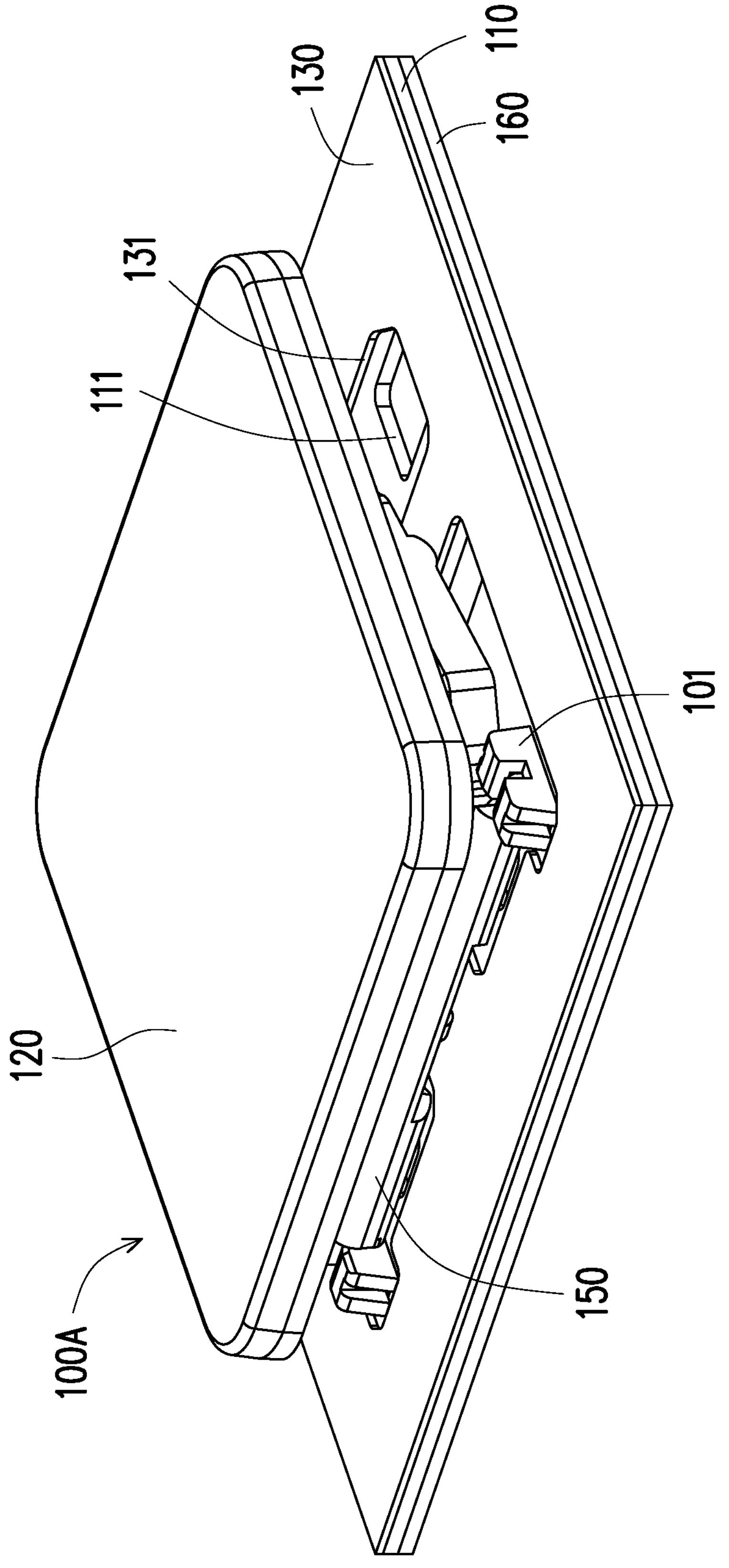
FIG. 1A is a schematic view of a key structure of the first embodiment of the disclosure.

Reference will now be made in detail to the exemplary embodiments of the disclosure, and examples of the exemplary embodiments are illustrated in the accompanying drawings. Wherever possible, elements with the same reference numerals in the drawings and descriptions represent the same or similar parts.

Figure 1B:
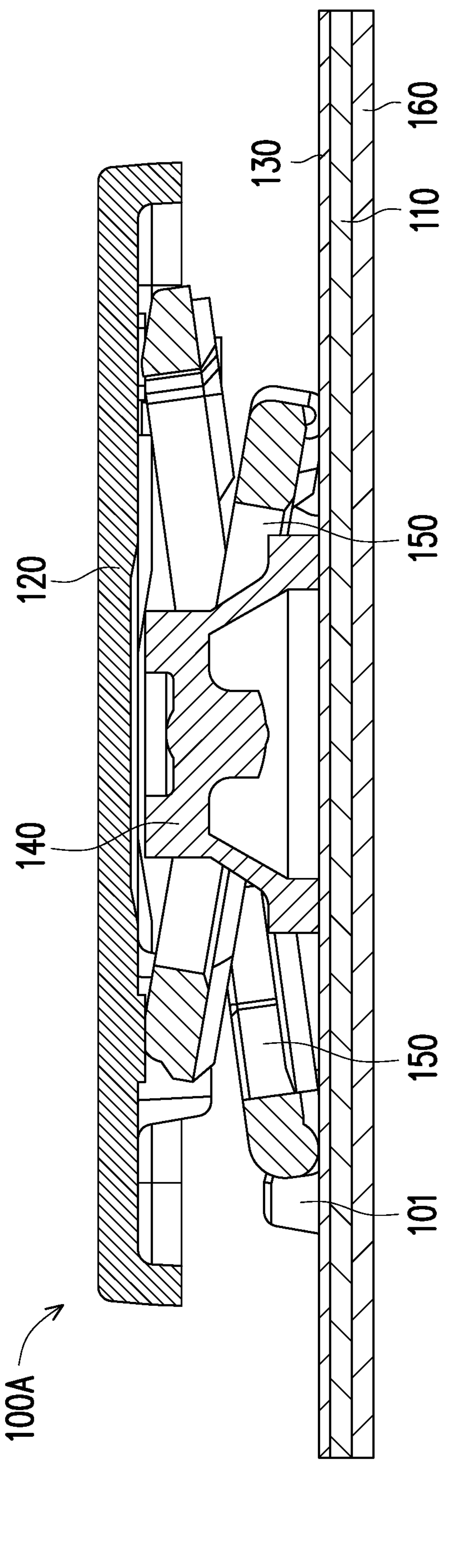
FIG. 1B is a schematic cross-sectional view of the key structure of FIG. 1A.

FIG. 1A is a schematic view of a key structure of the first embodiment of the disclosure. FIG. 1B is a schematic cross-sectional view of the key structure of FIG. 1A. Referring to FIGS. 1A and 1B, in this embodiment, a key structure 100A may be applied to a keyboard, and a capacitive trigger mechanism is adopted, which has not only high sensitivity but low mechanical wear. In detail, the key structure 100A includes an electrode layer 110, a key cap 120, an insulative base plate 130, and a restoration member. The key cap 120 is disposed on the electrode layer 110, and the insulative base plate 130 is disposed on the electrode layer 110. The insulative base plate 130 is located between the key cap 120 and the electrode layer 110. The restoration member may include an elastic member 140 and a connection assembly 150, and is disposed between the key cap 120 and the electrode layer 110.

The elastic member 140 is used to support the key cap 120 and provide an elastic force required for resetting the key cap 120 after being pressed. One end of the connection assembly 150 is connected to the electrode layer 110, and another end of the connection assembly 150 is connected to the key cap 120 to maintain stability of the key cap 120 when being lifted and lowered. The elastic member 140 is, for example, a rubber dome, a metal dome, a spring, or an elastic piece, and the connection assembly 150 is, for example, a scissor-like structure. Furthermore, the key structure 100A further includes a positioning member 101. The positioning member 101 may be engaged with the electrode layer 110 through insert molding, and passes through the insulative base plate 130, so that the one end of the connection assembly 150 is connected to the positioning member 101. Another end of the connection assembly 150 is connected to the key cap 120. Besides, the key structure 100A further includes a backlight module 160. The electrode layer 110 is disposed on the backlight module 160, and the electrode layer 110 is located between the insulative base plate 130 and the backlight module 160. The electrode layer 110 has a first light transmission opening 111, and the insulative base plate 130 has a second light transmission opening 131 partially overlapping the first light transmission opening 111, so that light from the backlight module 160 may be projected toward the keycap 120 through the first light transmission opening 111 and the second light transmission opening 131 to satisfy a visual sensory experience of a user.

Referring to FIG. 1B, in an embodiment, the key cap 120 has conductivity. The key cap includes a conductive material, such as conductive particles, metal, transparent conductive oxide, carbon nanotube, or graphene. When the user presses down the key cap 120, a distance between the key cap 120 and the electrode layer 110 is correspondingly reduced, thereby achieving triggering by sensing a capacitance change on the electrode layer 110. In another embodiment, the elastic member 140 has the conductivity, and a material thereof may include conductive particles, metal, transparent conductive oxide, carbon nanotube, or graphene. When the user presses down the key cap 120, the elastic member 140 generates elastic compression and deformation, so that a distance between a part of the elastic member 140 and the electrode layer 110 is correspondingly reduced, thereby achieving triggering by sensing the capacitance change on the electrode layer 110. In still another embodiment, the connection assembly 150 has the conductivity, and a material thereof may include conductive particles, metal, transparent conductive oxide, carbon nanotube, or graphene. When the user presses down the key cap 120, the connection assembly 150 sinks to reduce a distance from the electrode layer 110 correspondingly, thereby achieving triggering by sensing the capacitance change on the electrode layer 110.

For example, the electrode layer 110 may be used as a first electrode or a stationary electrode. Correspondingly, the key cap 120, the elastic member 140, or the connection assembly 150 may be used as a second electrode or a movable electrode. As the key cap 120, the elastic member 140, or the connection assembly 150 moves relative to the electrode layer 110, a distance between the second electrode (or the movable electrode) and the first electrode (or the stationary electrode) is changed correspondingly. Furthermore, when the distance between the second electrode (or the movable electrode) and the first electrode (or the stationary electrode) is reduced, a capacitance value is increased. Once the capacitance value is greater than a set value, a sensing signal or a trigger signal is generated.

A design of any one of the key cap 120, the elastic member 140, and the connection assembly 150 having the conductivity could not only enhance operating sensitivity of the key structure 100A, but also reduce possibility of false triggering. Besides, since the key structure 100A is not required to be provided with other conductive members to achieve triggering, it could simplify the complexity of the mechanism.

Referring to FIG. 1A, a part of the electrode layer 110 is exposed to the second light transmission opening 131 of the insulative base plate 130 to reduce blocking between the electrode layer 110 and any one of the key cap 120, the elastic member 140, and the connection assembly 150, thereby enhancing sensing sensitivity. For example, the insulative base plate 130 may have other through holes located around the second light transmission opening 131 to expose the part of the electrode layer 110. Besides, the insulative base plate 130 may be formed by materials such as plastic, carbon fiber, or glass fiber.

Figure 2:
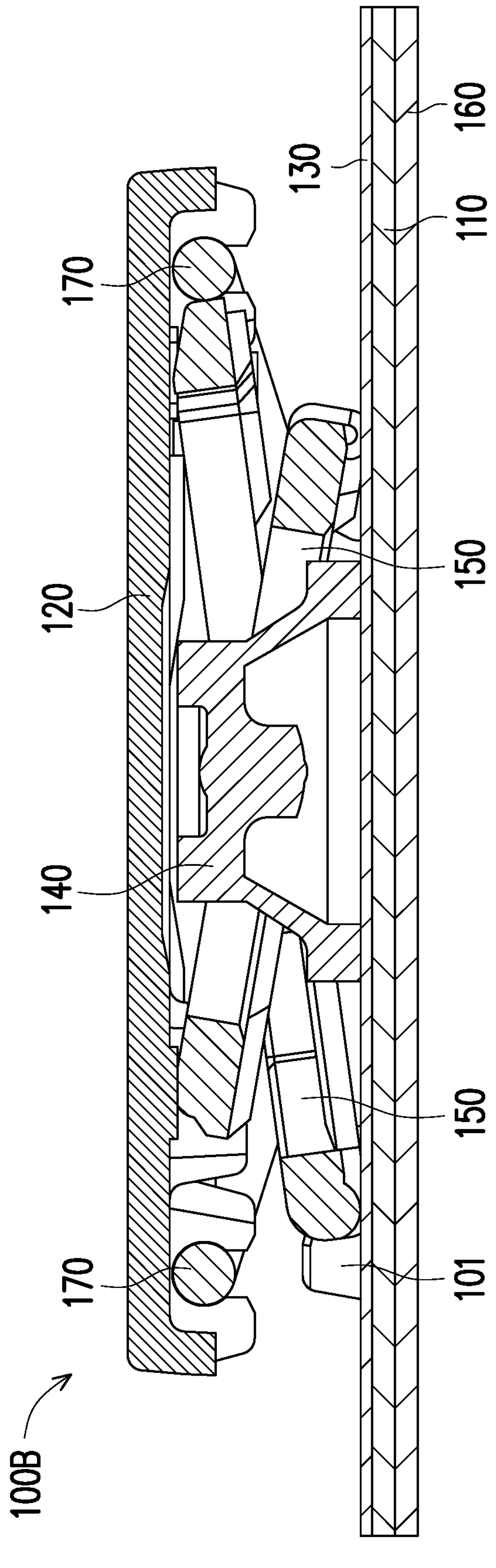
FIG. 2 is a schematic cross-sectional view of a key structure of the second embodiment of the disclosure.

FIG. 2 is a schematic cross-sectional view of a key structure of the second embodiment of the disclosure. Referring to FIG. 2, a concept of a key structure 100B of this embodiment is substantially the same as a concept of the key structure 100A of the first embodiment. A difference between the two is that the key structure 100B further includes a balance rod 170 disposed between the key cap 120 and the electrode layer 110, and the balance rod 170 includes an insulating material to avoid affecting the sensing sensitivity of the electrode layer 110. For example, the key structure 100B may be a space key or other long keys on the keyboard. Besides, the balance rod 170 may be formed by the insulating material such as plastic, rubber, carbon fiber, or glass fiber, or may be covered with the insulating material such as plastic, rubber, carbon fiber, or glass fiber on an outside of the balance rod 170.

Figure 3:
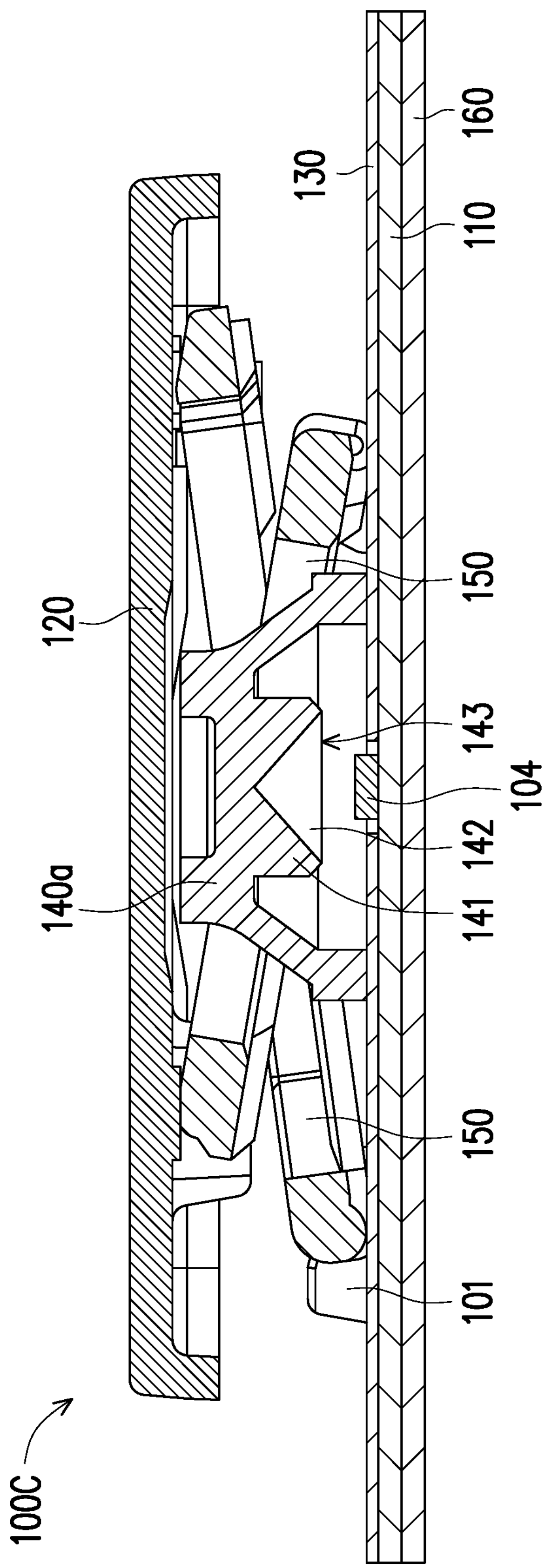
FIG. 3 is a schematic cross-sectional view of a key structure of the third embodiment of the disclosure.

FIG. 3 is a schematic cross-sectional view of a key structure of the third embodiment of the disclosure. Referring to FIG. 3, a concept of a key structure 100C of this embodiment is substantially the same as the concept of the key structure 100A of the first embodiment. A difference between the two is that an elastic member 140*a* in the key structure 100C has the conductivity and has a protrusion 141 facing the electrode layer 110. In detail, the protrusion 141 has a recess 142, and an opening 143 of the recess 142 faces the electrode layer 110. The protrusion 141 may be a W-shaped protrusion or an inverted M-shaped protrusion, which could enhance the sensing sensitivity of the electrode layer 110. Besides, the key structure 100C further includes a light source 104 disposed on the electrode layer 110. The insulative base plate 130 has a through hole for accommodating the light source 104, and the light source 104 is disposed corresponding to the recess 142 of the elastic member 140*a*. The light source 104 is electrically connected to the electrode layer 110 to receive a signal or power from the electrode layer 110. The recess 142 may be used as an accommodating space or an avoiding space for the light source 104. When the key structure 100C is pressed, the elastic member 140*a* generates elastic compression and deformation, and the light source 104 moves into the recess 142. Therefore, the elastic member 140*a* that generates the elastic compression and deformation does not interfere with the light source 104.

Figure 4:
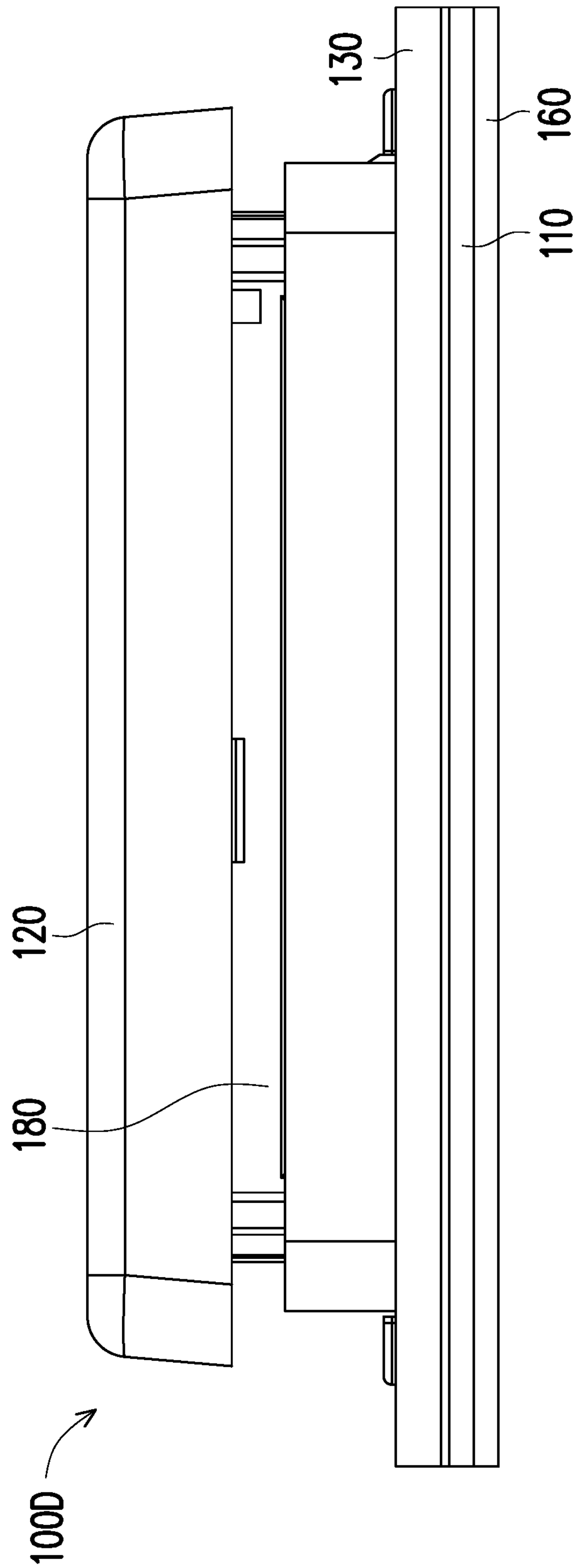
FIG. 4 is a schematic side view of a key structure of the fourth embodiment of the disclosure.

FIG. 4 is a schematic side view of a key structure of the fourth embodiment of the disclosure. Referring to FIG. 4, a concept of a key structure 100D of this embodiment is substantially the same as the concept of the key structure 100A of the first embodiment. A difference between the two is that the key structure 100D may be a mechanical key structure, and an axis body 180 is used as the restoration member. The insulative base plate 130 may have a positioning member (not shown), and one end of the axis body 180 is connected to and fixed to the positioning member (not shown). In an embodiment, the key cap 120 has the conductivity, and a material thereof may include conductive particles, metal, transparent conductive oxide, carbon nanotube, or graphene. When the user presses down the key cap 120, the distance between the key cap 120 and the electrode layer 110 is correspondingly reduced, thereby achieving triggering by sensing the capacitance change on the electrode layer 110. In another embodiment, the axis body 180 has the conductivity, and a material thereof may include conductive particles, metal, transparent conductive oxide, carbon nanotube, or graphene. When the user presses down the key cap 120, the axis body 180 sinks to reduce the distance from the electrode layer 110 correspondingly, thereby achieving triggering by sensing the capacitance change on the electrode layer 110.

Figure 5:
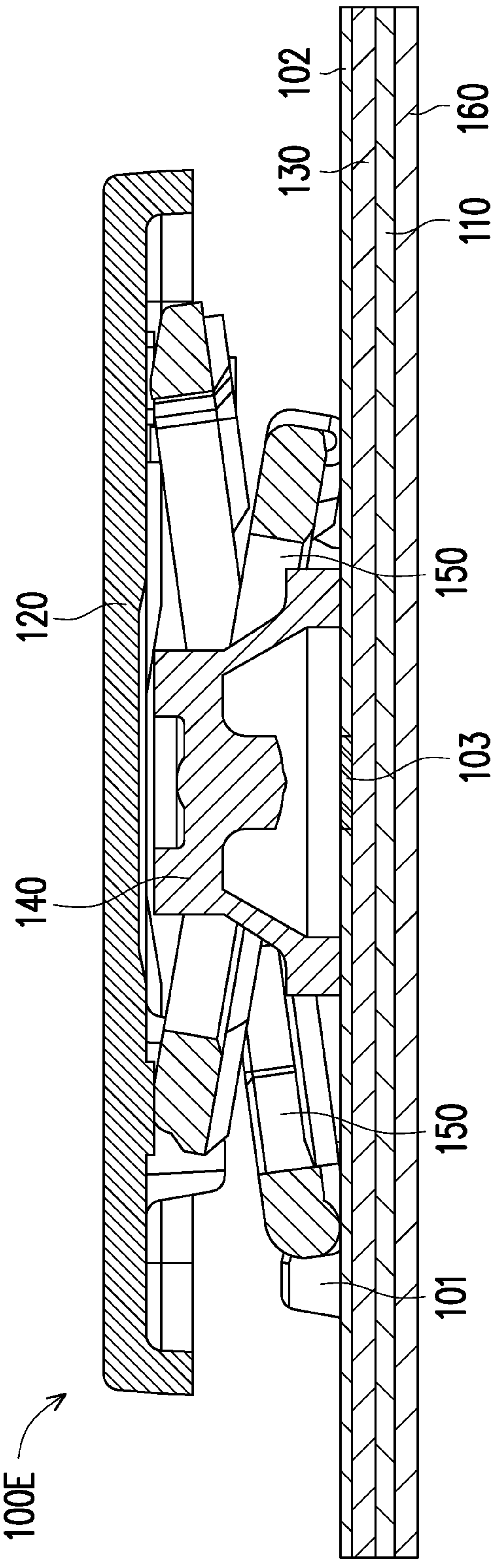
FIG. 5 is a schematic cross-sectional view of a key structure of the fifth embodiment of the disclosure.

FIG. 5 is a schematic cross-sectional view of a key structure of the fifth embodiment of the disclosure. Referring to FIG. 5, a concept of a key structure 100E of this embodiment is substantially the same as the concept of the key structure 100A of the first embodiment. A difference between the two is that the key structure 100E further includes a membrane circuit 102 disposed on the insulative base plate 130. The membrane circuit 102 is located between the elastic member 140 and the insulative base plate 130, and the elastic member 140 covers a conductive contact 103 on the membrane circuit 102. When the user presses down the key cap 120, the elastic member 140 generates the elastic compression and deformation, so that the membrane circuit 102 is squeezed by the elastic member 140 to conduct the conductive contact 103, thereby achieving triggering. For example, the conductive contact 103 may be used as a switch assembly disposed on the electrode layer 110. When the key structure 100E is pressed, the switch assembly generates the trigger signal by contacting. Besides, the electrode layer 110 may sense touching, sliding, other gestures, or other contact behaviors of a finger of the user on the key cap 120.

Figure 6A:
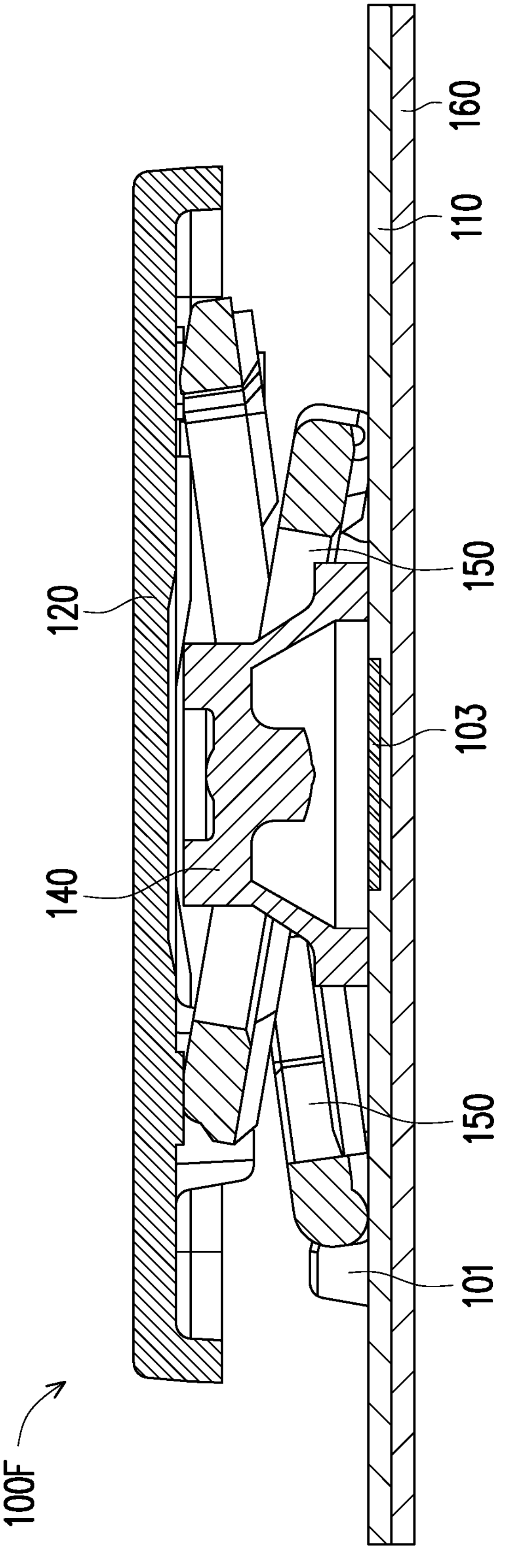
FIG. 6A is a schematic cross-sectional view of a key structure of the sixth embodiment of the disclosure.
Figure 6B:
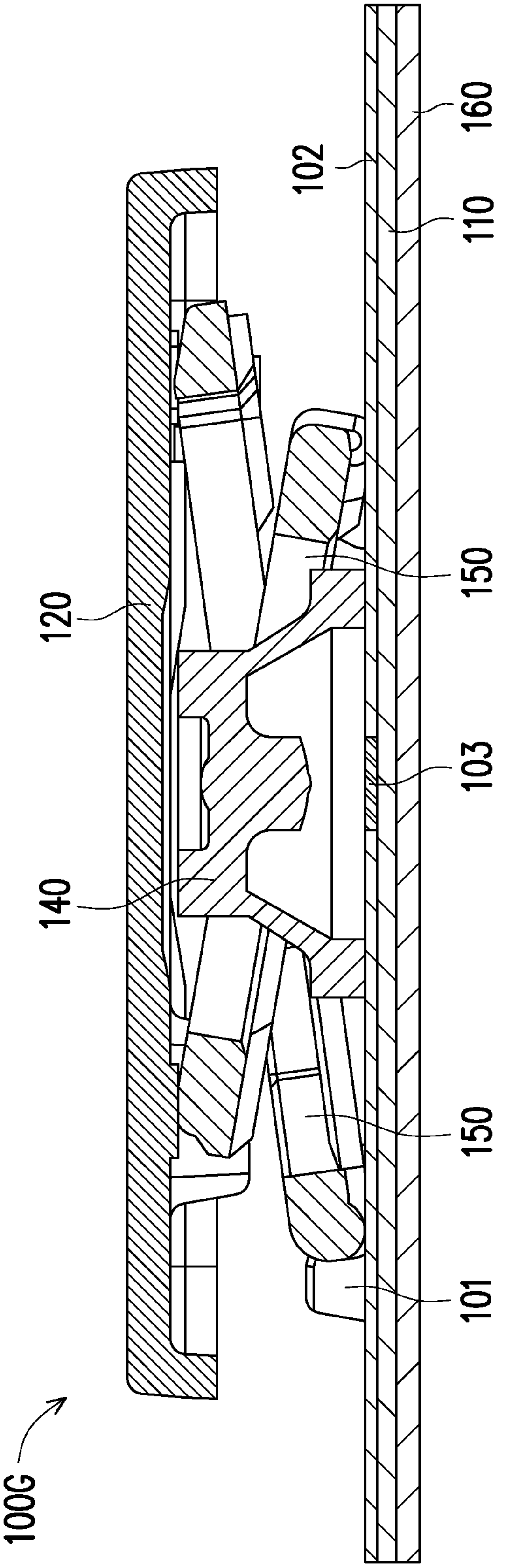
FIG. 6B is a schematic cross-sectional view of a key structure of the seventh embodiment of the disclosure.

FIG. 6A is a schematic cross-sectional view of a key structure of the seventh embodiment of the disclosure. Referring to FIG. 6A, a concept of a key structure 100F of this embodiment is substantially the same as a concept of the key structure 100E of the fifth embodiment. A difference between the two is that the key structure 100F is not provided with the insulative base plate 130 (see FIG. 5) and the membrane circuit 102 (see FIG. 5). The conductive contact 103 may be a conductive pattern on the electrode layer 110, and the elastic member 140 covers the conductive contact 103. In detail, the elastic member 140 has the conductivity. When the user presses down the key cap 120, the elastic member 140 generates the elastic compression and deformation and contacts the conductive contact 103 to conduct the conductive contact 103, thereby achieving triggering. For example, the conductive contact 103 may be used as the switch assembly disposed on the electrode layer 110. When the key structure 100F is pressed, the switch assembly generates the trigger signal by contacting. FIG. 6B is a schematic cross-sectional view of a key structure of the sixth embodiment of the disclosure. Referring to FIG. 6B, a concept of a key structure 100G of this embodiment is substantially the same as the concept of the key structure 100E of the fifth embodiment. A difference between the two is that the key structure 100G is not provided with the insulative base plate 130 (see FIG. 5). The membrane circuit 102 is disposed on the electrode layer 110, and is located between the elastic member 140 and the electrode layer 110. For example, the conductive contact 103 may be used as the switch assembly disposed on the electrode layer 110. When the key structure 100G is pressed, the switch assembly generates the trigger signal by contacting.

Figure 7:
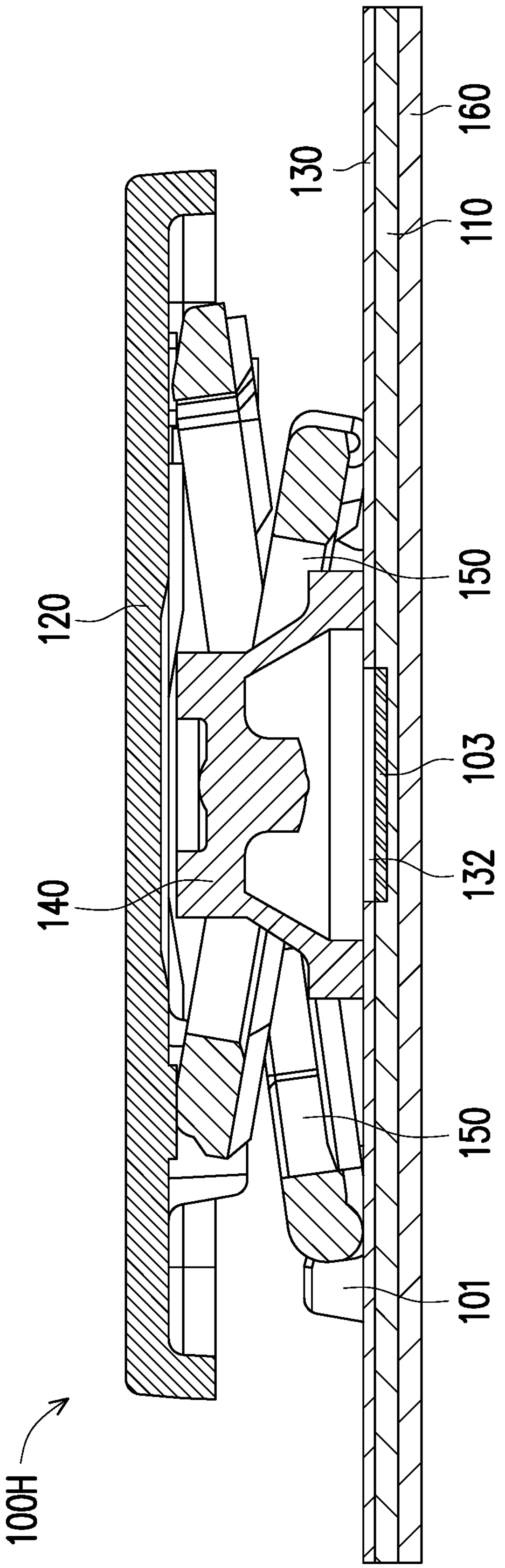
FIG. 7 is a schematic cross-sectional view of a key structure of the eighth embodiment of the disclosure.

FIG. 7 is a schematic cross-sectional view of a key structure of the eighth embodiment of the disclosure. Referring to FIG. 7, a concept of a key structure 100H of this embodiment is substantially the same as the concept of the key structure 100E of the fifth embodiment. A difference between the two is that in the key structure 100H of this embodiment, the conductive contact 103 may be the conductive pattern on the electrode layer 110, and is exposed to a through hole 132 of the insulative base plate 130. In detail, the elastic member 140 covers the through hole 132 and the conductive contact 103, and the elastic member 140 has the conductivity. When the user presses down the key cap 120, the elastic member 140 generates the elastic compression and deformation and contacts the conductive contact 103 to conduct the conductive contact 103, thereby achieving triggering. For example, the conductive contact 103 may be used as the switch assembly disposed on the electrode layer 110. When the key structure 100H is pressed, the switch assembly generates the trigger signal by contacting.

Figure 8:
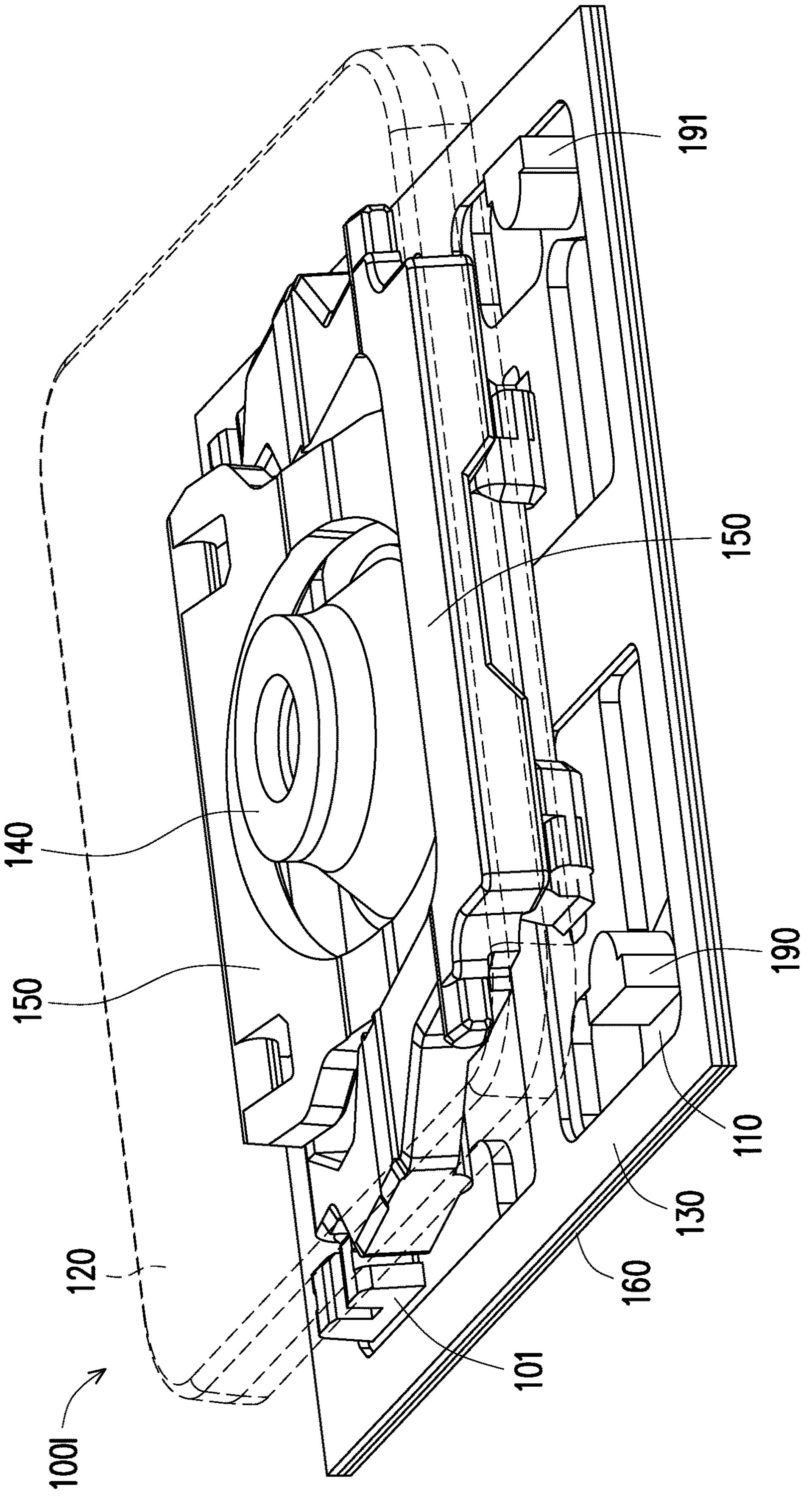
FIG. 8 is a schematic view of a key structure of the ninth embodiment of the disclosure.

FIG. 8 is a schematic view of a key structure of the ninth embodiment of the disclosure. Referring to FIG. 8, a concept of a key structure 100I of this embodiment is substantially the same as the concept of the key structure 100E of the fifth embodiment. A difference between the two is that a contact trigger mechanism is adopted in the key structure 100E of the fifth embodiment, while a non-contact trigger mechanism is adopted in the key structure 100I. In detail, an optical trigger mechanism is adopted in the key structure 100I, and therefore an optical switch module disposed on the electrode layer 110 is included. The optical switch module is located between the key cap 120 and the electrode layer 110, and includes an optical transmitter 190 and an optical receiver 191. A part of the connection assembly 150 may have a moving path passes between the optical transmitter 190 and the optical receiver 191. When the user presses down the key cap 120, an optical transmission and reception path between the optical transmitter 190 and the optical receiver 191 is blocked by the connection assembly 150, thereby achieving triggering. For example, the optical switch module may be used as the switch assembly disposed on the electrode layer 110. When the key structure 100I is pressed, the switch assembly generates the trigger signal by blocking.

In this way, the key structure of the above embodiment has two keyboard input modes at the same time, and the user may have different user experiences by switching a triggering mode or a sensing mode, such as triggering by pressing and adjusting lighting effects or sound effects by gesture sensing, etc.

Figure 9:
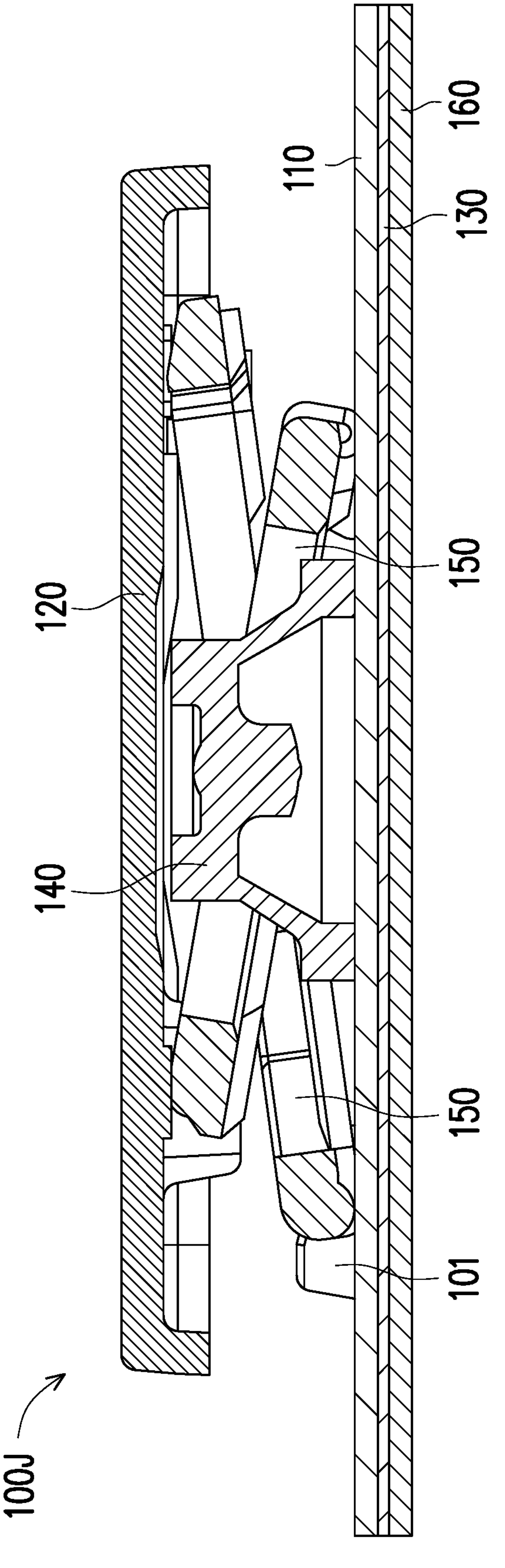
FIG. 9 is a schematic cross-sectional view of a key structure of the tenth embodiment of the disclosure.

FIG. 9 is a schematic cross-sectional view of a key structure of the tenth embodiment of the disclosure. Referring to FIG. 9, a concept of a key structure 100J of this embodiment is substantially the same as the concept of the key structure 100A of the first embodiment. A difference between the two is that in the key structure 100J of this embodiment, the electrode layer 110 is disposed on the insulative base plate 130, and the insulative base plate 130 is located between the electrode layer 110 and the backlight module 160. Furthermore, the arranged configuration of the electrode layer 110 and the insulative base plate 130 in the key structure 100A of the second embodiment to the key structure 100E of the fifth embodiment and the key structure 100I of the ninth embodiment may also be adjusted according to design requirements.

Figure 10A:
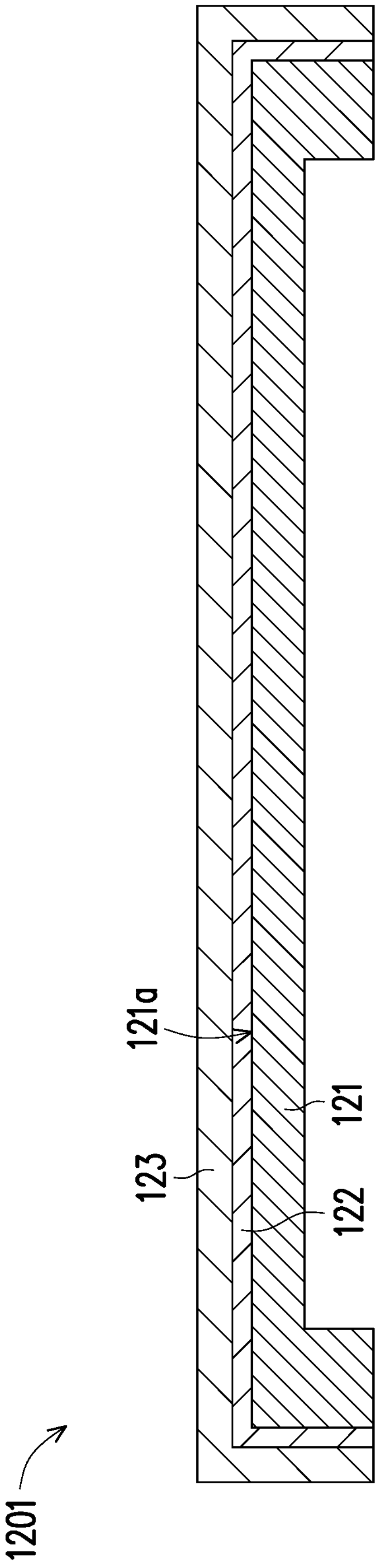
FIGS. 10A to 10D are schematic cross-sectional views of key caps of different embodiments of the disclosure.

FIGS. 10A to 10D are schematic cross-sectional views of key caps of different embodiments of the disclosure. Referring to FIG. 10A, a key cap 1201 has the conductivity. The key cap 1201 includes a body 121, a conductive layer 122, and a passivation layer 123, and the conductive layer 122 completely covers an outer surface 121*a* of the body 121. The conductive layer 122 is located between the passivation layer 123 and the body 121, and is covered by the passivation layer 123, so as to be protected by the passivation layer 123 to reduce probability of damage. The conductive layer 122 may be a conductor or a semiconductor, so that surface conductivity of the key cap 1201 is better than that of an insulator. For example, a material of the conductive layer 122 may include conductive particles, metal, transparent conductive oxide, carbon nanotube, or graphene, and a surface impedance of the key cap 1201 is lower than 300K ohms. In an embodiment, the conductive layer 122 of the key cap 1201 is a light-transmitting conductive film, and a material thereof is, for example, indium tin oxide (ITO) or fluorine-doped tin oxide (FTO) with a transmittance greater than 80% and a resistivity less than 10 Ω·cm. Therefore, light may transmit through the conductive layer 122 even though there is no through hole.

Figure 10B:
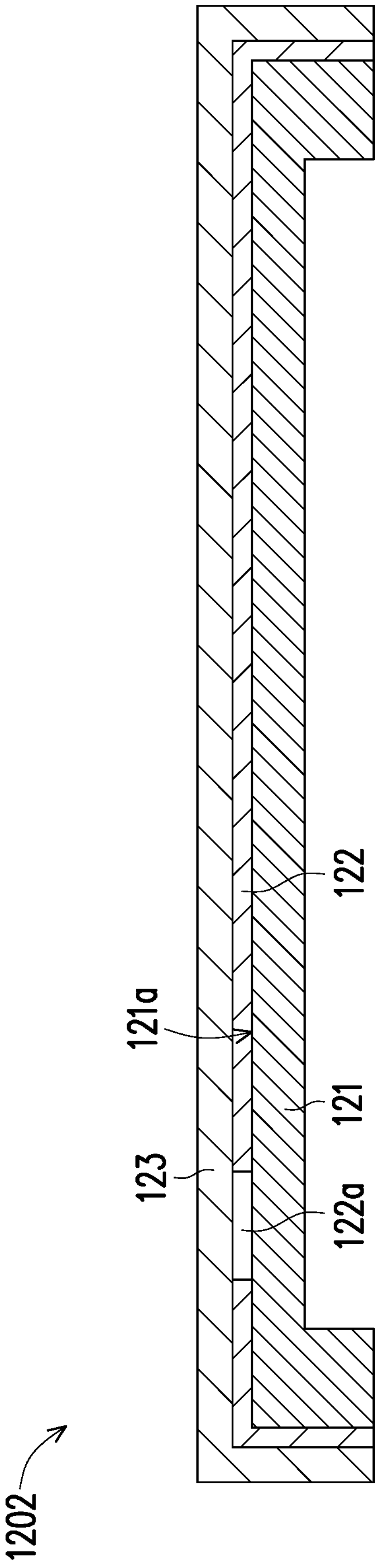

Referring to FIG. 10B, different from the key cap 1201, the conductive layer 122 of a key cap 1202 has a light transmission portion 122*a*, and a pattern of the light transmission portion 122*a* may be a character pattern. Besides, the passivation layer 123 may be a light-transmitting or transparent film layer.

Figure 10C:
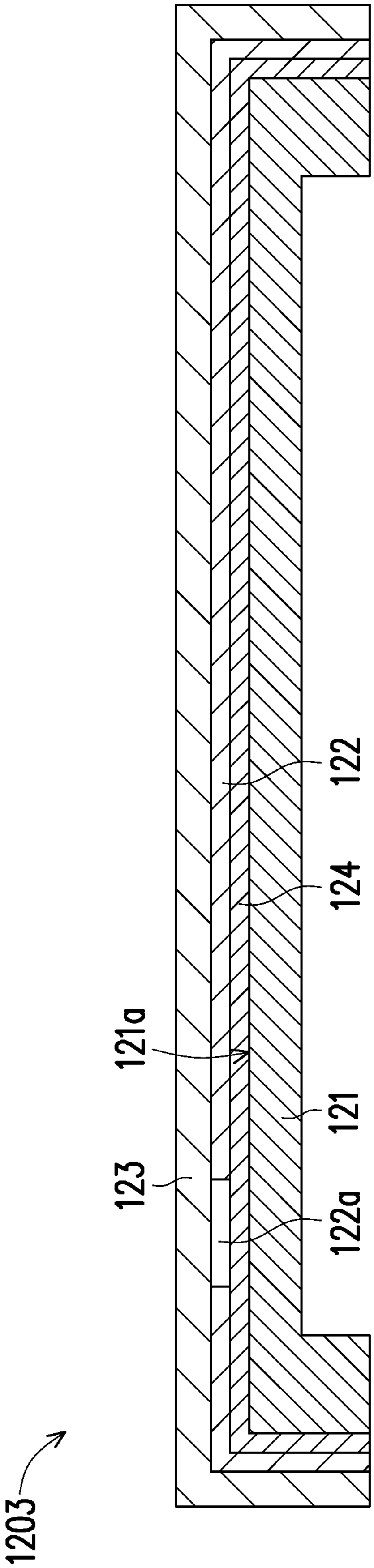

Referring to FIG. 10C, different from the key cap 1202, the key cap 1203 further includes a priming coat 124. The priming coat 124 is disposed on the body 121, and the priming coat 124 is located between the conductive layer 122 and the body 121. That is, the conductive layer 122 covers the priming coat 124, and the priming coat 124 covers the outer surface 121*a* of the body 121.

Figure 10D:
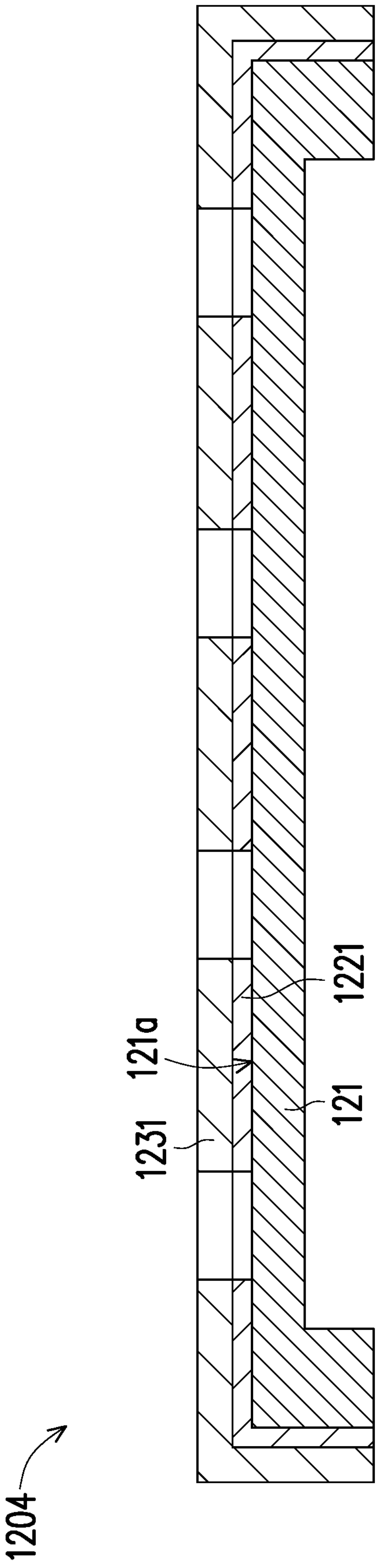
Figure 11A:
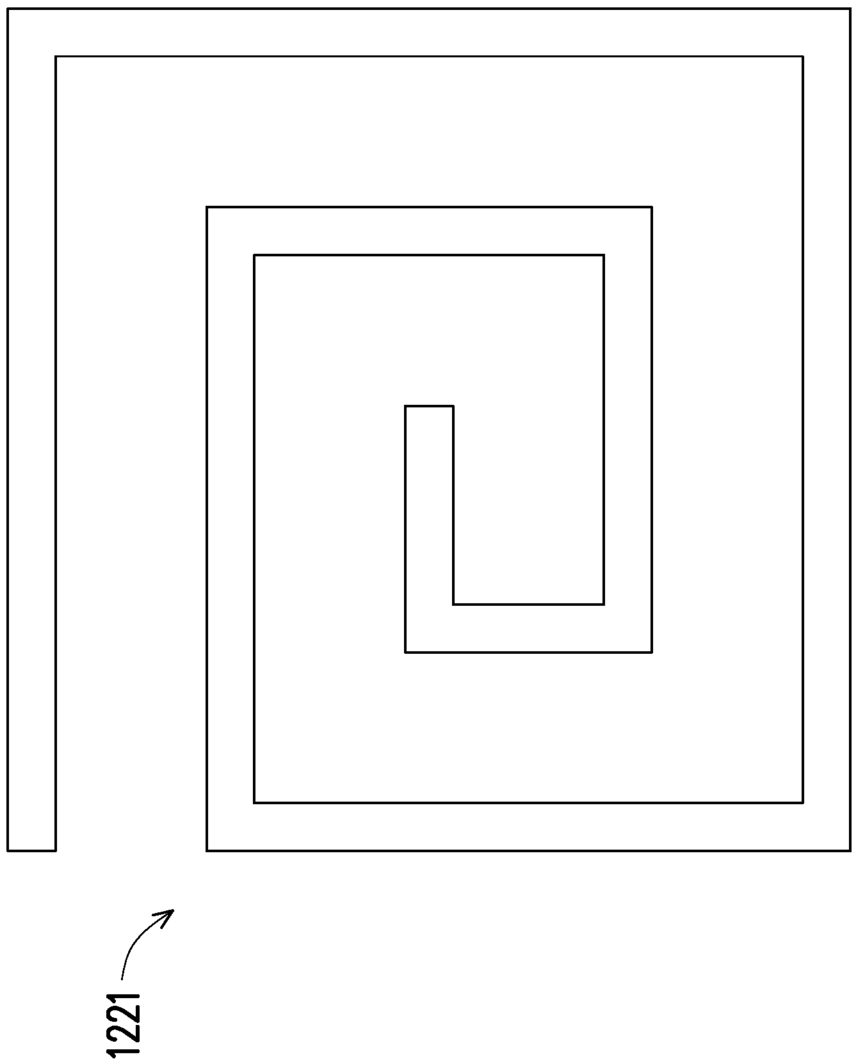
FIGS. 11A to 11C are schematic top views of conductive layers of different embodiments.
Figure 11B:
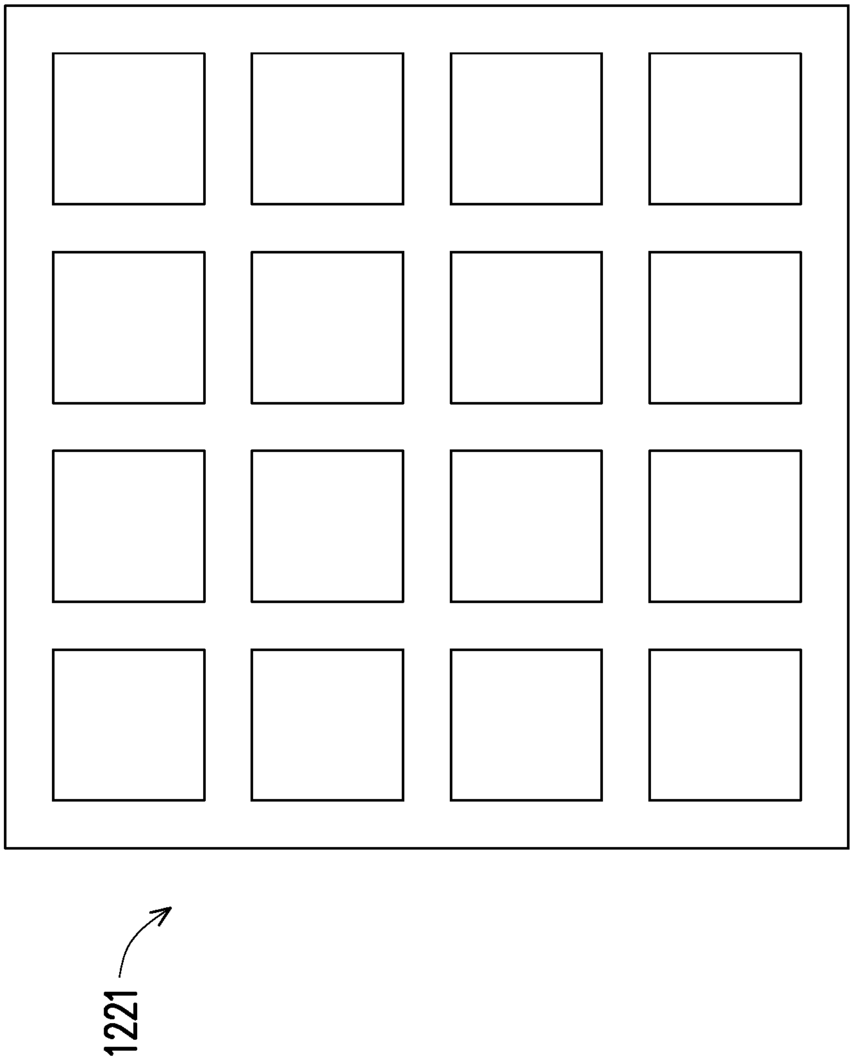
Figure 11C:
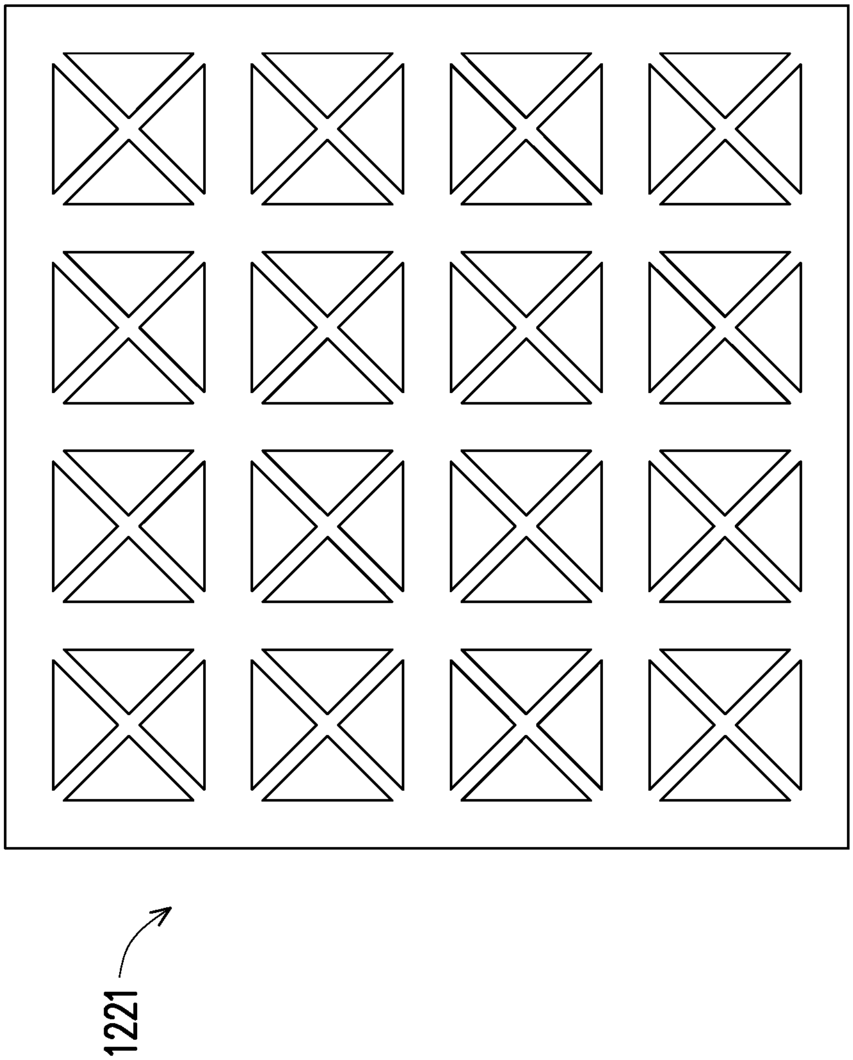

FIGS. 11A to 11C are schematic top views of conductive layers of different embodiments. Referring to FIG. 10D, different from the key cap 1201, a conductive layer 1221 of a key cap 1204 is a patterned conductive layer and partially covers the outer surface 121*a* of the body 121. Correspondingly, a passivation layer 1231 is a patterned passivation layer covering the conductive layer 122. For example, a pattern design of the conductive layer 1221 may be as shown in FIGS. 11A to 11C.

Based on the above, in the key structure of the disclosure, the design of any one of the key cap, the elastic member, and the connection assembly having the conductivity could not only enhance the operating sensitivity of the key structure, but also reduce the possibility of false triggering. Besides, since the key structure is not required to be provided with other conductive members to achieve triggering, it could simplify the complexity of the mechanism.

Finally, it should be noted that the above embodiments are only used to illustrate but not to limit the technical solutions of the disclosure. Although the disclosure has been described in detail with reference to the foregoing embodiments, persons skilled in the art should understand that they may still modify the technical solutions described in the foregoing embodiments or equivalently replace some or all of the technical features. However, the modifications or replacements do not cause the spirit of the corresponding technical solution to deviate from the scope of the technical solution according to each embodiment of the disclosure.

What is claimed is:

1. A key structure, comprising:
a first electrode;
a key cap, disposed on the first electrode; and
a restoration member, disposed between the key cap and the first electrode, wherein the key cap or the restoration member has a second electrode, and a sensing signal is generated by the second electrode with a movement of the key cap or the restoration member relative to the first electrode,
wherein the restoration member is an elastic member having a protrusion facing the first electrode and a recess corresponding to a central portion of the elastic member, and an opening of the recess defined by the protrusion faces the first electrode.

2. The key structure according to claim 1, wherein the restoration member has the second electrode, the restoration member comprises a connection assembly, or an axis body, and a material of the restoration member comprises conductive particles, metal, transparent conductive oxide, carbon nanotube, or graphene.

3. The key structure according to claim 1, further comprising a switch assembly, disposed on the first electrode, wherein when the key structure is pressed, the switch assembly generates a trigger signal through contacting or blocking.

4. The key structure according to claim 1, further comprising a balance rod disposed between the key cap and the first electrode, wherein the balance rod comprises an insulating material.

5. The key structure according to claim 1, further comprising a backlight module, wherein the first electrode is disposed on the backlight module, and the first electrode has a light transmission opening.

6. The key structure according to claim 1, further comprising a light source being disposed on the first electrode and corresponding to the recess of the elastic member.

7. The key structure according to claim 1, wherein the key cap has the second electrode, the key cap comprises a body and a conductive layer disposed on the body, and the conductive layer completely covers or partially covers an outer surface of the body.

8. The key structure according to claim 7, wherein the key cap further comprises a passivation layer disposed on the conductive layer, and the conductive layer is located between the passivation layer and the body.

9. The key structure according to claim 7, wherein the key cap further comprises a priming coat disposed on the body, and the priming coat is located between the conductive layer and the body.

10. The key structure according to claim 7, wherein the conductive layer has a light transmission portion.

11. The key structure according to claim 7, wherein a material of the key cap comprises conductive particles, metal, transparent conductive oxide, carbon nanotube, or graphene.

12. A key structure, comprising:
an electrode layer;
a key cap, disposed on the electrode layer, wherein the key cap comprises a conductive material;
an insulative base plate, disposed on the electrode layer and located between the key cap and the electrode layer, wherein the insulative base plate is provided with a first surface and an opposite second surface;
an elastic member, disposed between the key cap and the insulative base plate;

a connection assembly, disposed between the key cap and the electrode layer;

a positioning member extending from the second surface to the first surface, wherein the positioning member is disposed around and separated from the elastic member, one end of the connection assembly is connected to the positioning member and another end of the connection assembly is connected to the key cap; and a backlight module, wherein the electrode layer is disposed between the insulative base plate and the backlight module, the key cap has a light transmission portion, the electrode layer has a first light transmission opening corresponding to the light transmission portion, and the insulative base plate has a second light transmission opening partially overlapping the first light transmission opening.

13. The key structure according to claim 12, wherein the key cap comprises:

a body;

a conductive layer, disposed on the body, wherein the conductive layer completely covers or partially covers an outer surface of the body;

a passivation layer, disposed on the conductive layer, wherein the conductive layer is located between the passivation layer and the body, and the conductive layer has a light transmission portion.

14. The key structure according to claim 12, wherein a material of the key cap comprises conductive particles, metal, transparent conductive oxide, carbon nanotube, or graphene, and a material of the insulative base plate comprises plastic, carbon fiber, or glass fiber.

15. The key structure according to claim 12, wherein the positioning member is engaged with the electrode layer and passes through the insulative base plate or the positioning member is engaged with the insulative base plate.

16. A key structure, comprising:

an electrode layer;

a key cap, disposed on the electrode layer;

an elastic member, disposed between the key cap and the electrode layer; and a connection assembly, disposed between the key cap and the electrode layer, wherein the elastic member and the connection assembly are separate members and the connection assembly has electrical conductivity, and wherein conductive particles are added to the connection assembly, so that the connection assembly sinks to reduce a distance from the electrode layer to generate a trigger signal.

17. The key structure according to claim 16, further comprising a positioning member, wherein the positioning member is engaged with the electrode layer, and one end of the connection assembly is connected to the positioning member.

18. The key structure according to claim 16, wherein a material of the connection assembly comprises conductive particles, metal, transparent conductive oxide, carbon nanotube, or graphene, so that the connection assembly moves relative to the electrode layer to generate a sensing signal.

19. A key structure, comprising:

an electrode layer;

a key cap, disposed on the electrode layer, wherein a material of the key cap comprises conductive particles, metal, transparent conductive oxide, carbon nanotube, or graphene, so that the key cap moves relative to the electrode layer to generate a sensing signal;

a restoration member, disposed between the key cap and the electrode layer; and an optical switch module, disposed on the electrode layer and located between the key cap and the electrode layer, wherein the optical switch module is located at a side of the electrode layer facing the key cap.

20. The key structure according to claim 19, wherein the optical switch module comprises an optical transmitter and an optical receiver, the restoration member comprises a connection assembly or an axis body, and a part of the connection assembly or the axis body has a moving path that passes between the optical transmitter and the optical receiver.

21. The key structure according to claim 20, furthering comprising a positioning member, wherein the positioning member is disposed on the electrode layer, and one end of the restoration member is connected to the positioning member.

22. A key structure, comprising:

an electrode layer;

a key cap, disposed on the electrode layer, wherein the key cap comprises a conductive material;

an insulative base plate, disposed on the electrode layer and located between the key cap and the electrode layer, wherein the insulative base plate is provided with a first surface and an opposite second surface;

an elastic member, disposed between the key cap and the insulative base plate;

a connection assembly, disposed between the key cap and the electrode layer;

a positioning member extending from the second surface to the first surface, wherein the positioning member is disposed around and separated from the elastic member, one end of the connection assembly is connected to the positioning member and another end of the connection assembly is connected to the key cap; and a light source, electrically connected to the electrode layer, wherein the elastic member has an accommodating space, and the light source is located in the accommodating space, when the key structure is pressed, the elastic member does not interfere with the light source.

23. The key structure according to claim 22, wherein the insulative base plate comprises a hole corresponding to the light source.

24. The key structure according to claim 22, wherein the positioning member is engaged with the electrode layer and passes through the insulative base plate or the positioning member is engaged with the insulative base plate.

* * * * *